(12) United States Patent
Nunes

(10) Patent No.: US 8,744,027 B2
(45) Date of Patent: Jun. 3, 2014

(54) INFRARED RECEIVER CIRCUIT

(75) Inventor: Markus Fuchs Nunes, Konz (DE)

(73) Assignee: Vishay Semiconductor GmbH, Heilbronn (DE)

( * ) Notice: Subject to any disclaimer, the term of this patent is extended or adjusted under 35 U.S.C. 154(b) by 161 days.

(21) Appl. No.: 13/130,596

(22) PCT Filed: Nov. 9, 2009

(86) PCT No.: PCT/EP2009/007997
§ 371 (c)(1),
(2), (4) Date: Jun. 27, 2011

(87) PCT Pub. No.: WO2010/060536
PCT Pub. Date: Jun. 3, 2010

(65) Prior Publication Data
US 2011/0243286 A1    Oct. 6, 2011

(30) Foreign Application Priority Data
Nov. 26, 2008  (DE) .................... 10 2008 058 878

(51) Int. Cl.
*H04B 1/10* (2006.01)
(52) U.S. Cl.
USPC ............................................. 375/350
(58) Field of Classification Search
USPC ............................................. 375/350
See application file for complete search history.

(56) References Cited

U.S. PATENT DOCUMENTS

| 3,924,120 | A | | 12/1975 | Cox, III |
| 6,049,562 | A | * | 4/2000 | Dekker ........................ 375/136 |
| 6,385,262 | B1 | * | 5/2002 | Gustafsson et al. .......... 375/350 |
| 7,120,416 | B2 | * | 10/2006 | Tomita ......................... 455/340 |
| 2003/0117108 | A1 | * | 6/2003 | Watson et al. ................ 320/114 |
| 2006/0044961 | A1 | * | 3/2006 | Jin ............................. 369/44.13 |

FOREIGN PATENT DOCUMENTS

| EP | 0 480 410 A2 | 4/1992 |
| EP | 0 480 410 B1 | 4/1992 |
| EP | 1 238 468 A1 | 9/2002 |
| EP | 1 238 468 B1 | 9/2002 |
| WO | WO-01/94899 A1 | 12/2001 |
| WO | WO-02/13403 A1 | 2/2002 |

OTHER PUBLICATIONS

International Preliminary Report dated Jun. 9, 2011. PCT/EP09/007997.
German Search Report dated Aug. 25, 2009, DE 10 2008 058 878.4.

* cited by examiner

*Primary Examiner* — Chieh M Fan
*Assistant Examiner* — Tanmay Shah
(74) *Attorney, Agent, or Firm* — Gifford, Krass, Sprinkle, Anderson & Citkowski, P.C.

(57) ABSTRACT

The invention relates to an infrared receiver circuit for receiving a carrier-modulated infrared signal that comprises a carrier signal and a wanted signal modulated onto the carrier signal, having a band pass filter that exhibits a frequency adjustment connection via which the band center frequency of the band pass filter can be adjusted, furthermore having a demodulator for recovering the wanted signal and having a signal output to which the demodulated wanted signal can be output. The infrared receiver circuit exhibits a signal input that is at least indirectly connected to the frequency adjustment connection of the band pass filter so that the band center frequency of the band pass filter can be adjusted by a clock signal of an external clock pulse generator.

13 Claims, 3 Drawing Sheets

INFRARED RECEIVER CIRCUIT

CROSS-REFERENCE TO RELATED APPLICATIONS

Figure 1:
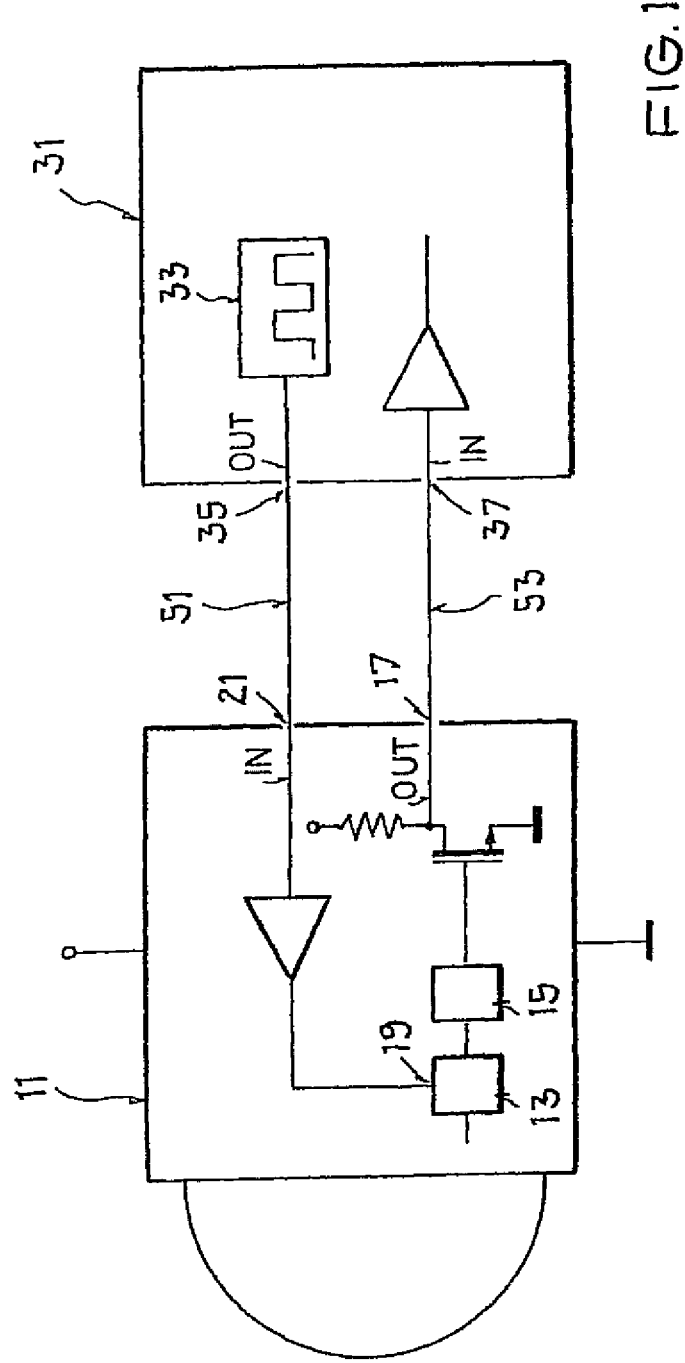

This application is the U.S. National Phase of PCT/EP2009/007997 filed Nov. 9, 2009, which claims priority of German Patent Application DE 10 2008 058 878.4 filed Nov. 26, 2008.

The present invention relates to an infrared receiver circuit for the reception of a carrier modulated infrared signal, which includes a carrier signal and a wanted signal modulated onto the carrier signal, with a bandpass filter which has a frequency setting terminal via which the center frequency of the band of the bandpass filter can be set, furthermore with a demodulator for the recovery of the wanted signal and with a signal output at which the demodulated wanted signal can be output.

The wanted signal is modulated onto the carrier signal, for example while using an amplitude modulation or a digital modulation process, to generate the infrared signal (IR signal). The infrared signal, can be output, for example, by a remote control and can serve for the control of a TV set or of a DVD (digital versatile disk) unit. Such a unit then usually includes an infrared receiver having a photodiode which receives the infrared signal transmitted by the remote control and converts it into electrical signals and having an infrared receiver circuit which as a rule amplifies the electrical signals, filters them in a bandpass filter and subsequently demodulates them so that the wanted signal can be output at the signal output of the infrared receiver circuit.

Such an infrared receiver is shown by way of example in EP 1 238 468 B1 whose disclosure content is herewith included in the content of the present application.

The bandpass filter is in this respect tuned to the carrier frequency of the infrared signal, i.e. the carrier frequency of the infrared signal is within the pass band frequency of the bandpass filter, the center frequency of the band of the bandpass filter in particular corresponds to the carrier frequency of the infrared signal so that the infrared signal present as an electrical signal in the infrared receiver circuit can pass the bandpass filter without hindrance. Interference signals, for example from external light, which are outside the pass band frequency, which is narrow as a rule, are blocked, in contrast.

Such a bandpass filter is usually a tunable bandpass filter which can be controlled via a frequency setting terminal by a clock pulse generator of the infrared receiver circuit, with the center frequency of the band of the band filter depending on the clock pulse frequency of the clock pulse generator. Such a bandpass filter can be realized, for example, by a switched capacitor filter (SC filter).

In the manufacture of the infrared receiver circuit, which is usually realized as a semiconductor circuit, it is therefore possible to select one of a plurality of center frequencies of the band for the bandpass filter (for example 30.3 kHz, 33 kHz, 36 kHz, 36.7 kHz, 38 kHz, 40 kHz, 44 kHz or 56 kHz). For this purpose, the corresponding clock pulse frequency of the clock pulse generator must be selected, with additionally, as a rule, a fine adjustment of the selected clock pulse frequency being required to achieve a desired frequency precision. This can be achieved, for example, by known measures such as fusing.

The selection of a center frequency of the band and its fine adjustment, as a rule on the wafer level, is, however, time-intensive and cost-intensive.

It is the object of the invention to provide an infrared receiver circuit of the initially named kind which can be manufactured more cost effectively.

This object is satisfied by an infrared receiver circuit having the features of claim 1, and in particular in that the infrared receiver circuit has a signal input which is at least indirectly connected to the frequency setting terminal of the bandpass filter so that the center frequency of the band of the bandpass filter can be set by a clock pulse signal of an external clock pulse generator.

The infrared receiver circuit is therefore made such that it is possible to use the clock pulse signal of an external clock pulse generator for the setting of the center frequency of the band of the bandpass filter. The selection and fine adjustment of the clock pulse frequency of an internal clock pulse generator described above in connection with the prior art can therefore be omitted in the manufacture of the infrared receiver circuit. Instead, the center frequency of the band of the bandpass filter is tuned to the frequency of an external clock pulse signal.

The external clock pulse generator can be a microcontroller, for example, which is anyway included in a device in which an infrared receiver with the infrared receiver circuit in accordance with the invention is used, for example a TV set or a DVD unit. It is therefore even possible to dispense with a separate clock pulse generator of the infrared receiver circuit to realize the invention. Furthermore, a clock pulse signal provided by such a microcontroller is usually very precise so that the center frequency of the band of the infrared receiver circuit can be determined with high precision. Generally, however, another external clock pulse generator can also be used.

In accordance with an embodiment of the invention, the signal input is formed by the signal output. This has the advantage that no separate input is required for the infeed of the external clock pulse signal. Provided that the aforesaid microcontroller is used as an external clock pulse generator, no separate line is furthermore required either to transfer the clock pulse signal from the microcontroller to the infrared receiver circuit. It is rather the case that then that line can be used for this purpose which transfers the output demodulated wanted signal from the infrared receiver circuit to the microcontroller.

The signal input can, however, also be made separate from the signal output. A separate line is then admittedly required with respect to infrared receiver circuits known from the prior art, but said line is not of any great significance in comparison with the other cost saving due to the present invention. The signal input can in particular be directly connected to the bandpass filter, in which case the clock pulse signal of the external clock pulse generator is then preferably supplied continuously to the infrared receiver circuit.

In accordance with another embodiment of the invention, an electrical oscillator arranged between the signal input and the bandpass filter is provided within the infrared receiver circuit, with the oscillator being made to generate a frequency setting signal for the bandpass filter with the frequency of the external clock pulse signal when the external clock pulse signal is applied to the oscillator. The oscillator can, for example, be a phase locked loop device (PLL).

It is preferred in this respect if the oscillator is made also still to generate the frequency setting signal with the external clock pulse frequency when the external clock pulse signal is subsequently interrupted or if it is omitted. In other words, the internal oscillator therefore includes means which make it possible to "freeze" the previously delivered external clock pulse signal. This can be required, for example, if the signal input is formed by the signal output and the clock pulse signal is destroyed by the wanted signal so that the external clock pulse signal is interrupted at times or if the clock pulse signal is only available for an initialization time period and is omitted afterward.

The internal oscillator can be made to recognize when the external clock pulse signal is interrupted. An output of the demodulator can in particular be connected to an input of the oscillator, with the oscillator being made to recognize by reference to the demodulated wanted signal when the external clock pulse signal is interrupted. The oscillator can then itself decide at which time the external clock pulse signal should be "frozen" to prevent a zero signal being output to the bandpass filter which corresponds to a missing external clock pulse signal.

Provided in particular that the external clock pulse signal cannot or should not be made available continuously, for example to relieve the load on the aforesaid microcontroller, it is preferred, if the internal oscillator is made to synchronize the frequency setting signal for the bandpass filter to the external clock pulse frequency, i.e. to tune it, during an initialization time period in which the external clock pulse signal is applied to the oscillator. After the initialization time period, when the external clock pulse signal is then omitted for the further operation, the then "frozen" synchronized frequency setting signal can then also continue to be output to the bandpass filter.

The clock pulse frequency of the external clock pulse signal is preferably different from a whole number multiple of the center frequency of the band of the bandpass filter and/or from the carrier frequency of the infrared signal to avoid interference influences on the infrared receiver circuit caused by the coupling of the external clock pulse signal as much as possible.

The bandpass filter is preferably made as a switched capacitor filter.

The invention furthermore relates to a device, for example a TV set or a DVD unit, including an infrared receiver with an infrared receiver circuit such as has been described above and including an external clock pulse generator, in particular a microcontroller, coupled with the infrared receiver circuit.

Provided that the signal input in the infrared receiver circuit is formed by the signal output, the external clock pulse generator can include means which are made to extract the demodulated used signal from the demodulated used signal having the external clock pulse signal superimposed on it and output by the infrared receiver. The means can be made as software and/or hardware.

The invention furthermore relates to a method for the processing of a carrier modulated infrared signal which includes a carrier signal and a wanted signal modulated onto the carrier signal by means of an infrared receiver circuit in which the center frequency of the band of a bandpass filter is set by a clock pulse signal of an external clock pulse generator.

Further developments of the method in accordance with the invention result in an analog manner from the explained further developments of the infrared receiver circuit in accordance with the invention.

Further advantageous embodiments of the invention are set forth in the following description of the Figures, in the drawing and in the dependent claims.

Figure 2:
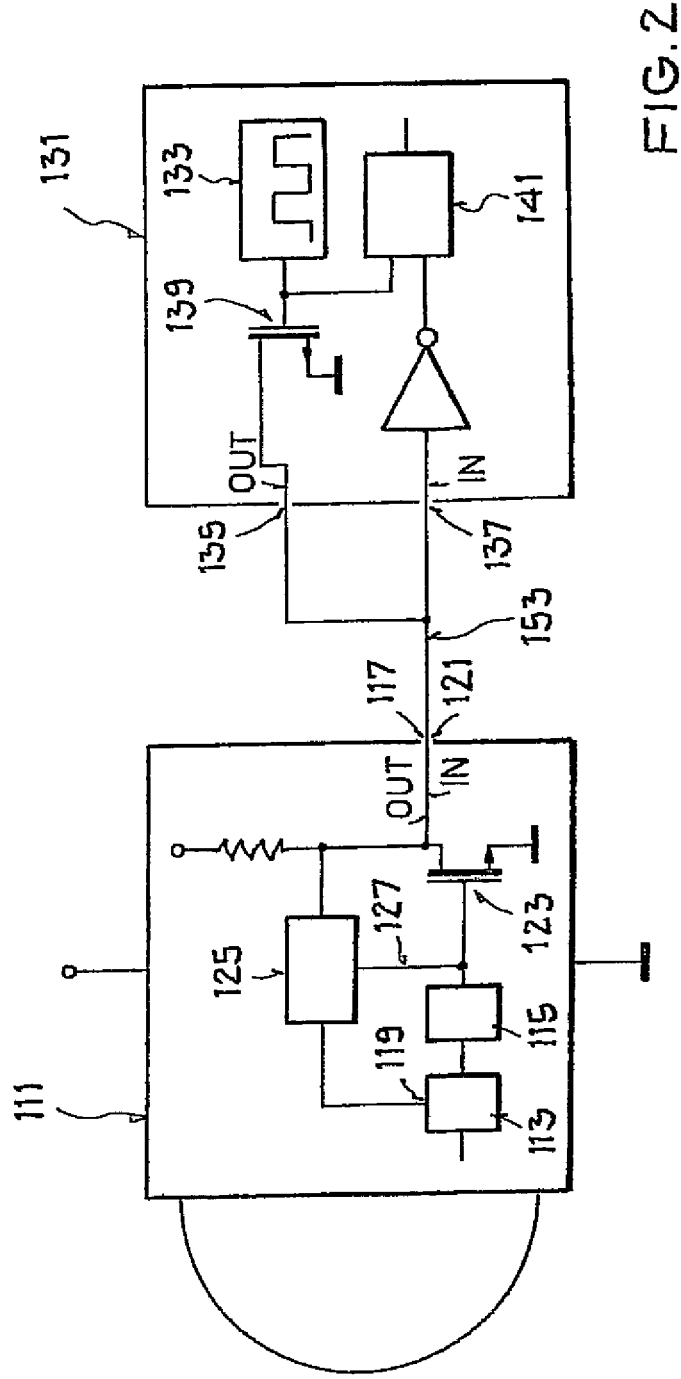
Figure 3:
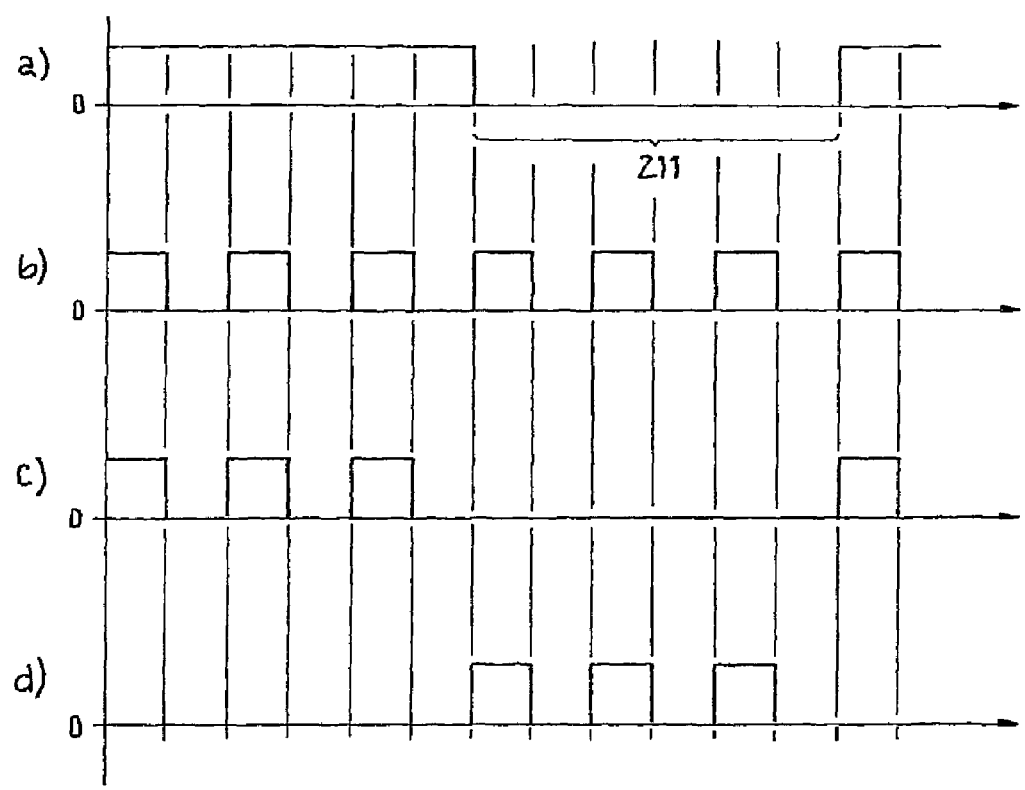

The invention will be explained only by way of example in the following with reference to the drawings. There are shown in it:

FIG. 1 a block diagram of a first embodiment of an infrared receiver in accordance with the invention coupled to a microcontroller;

FIG. 2 a block diagram of a second embodiment of an infrared receiver in accordance with the invention coupled to a microcontroller; and FIG. 3 pulse diagrams which represent switch states present at different points of the device in accordance with FIG. 2 comprising the infrared receiver and the microcontroller.

The infrared receiver 11 shown in FIG. 1 can generally have the design described, for example, in EP 1 238 468 B1 and the mode of operation described there. The infrared receiver 11 therefore includes a photodiode, not shown, for the reception of a carrier modulated infrared signal which includes a carrier signal and a wanted signal modulated onto the carrier signal and an infrared receiver circuit only shown in part.

The infrared receiver circuit includes an amplifier circuit, not shown, for the amplification of the infrared signal converted into an electrical signal by the photodiode, furthermore a bandpass filter 13 tuned to the carrier frequency of the infrared signal to separate the received infrared signal from interference signals, furthermore a demodulator 15 to recover the wanted signal from the filtered infrared signal and a signal output 17 at which the demodulated wanted signal can be output.

The bandpass filter 13 is made as a switched capacitor filter so that the center frequency of the band of the bandpass filter 13 is dependent on the frequency of a periodic clock pulse signal which is supplied to the bandpass filter 13. The bandpass filter 13 has a frequency setting terminal 19 for this purpose.

In infrared receiver circuits known from the prior art which are usually made as semiconductor components, this clock pulse signal is originally supplied by an internal clock pulse generator. Since at least slight deviations in the electrical properties of the internal clock pulse generators occur as a result of manufacture, the internal clock pulse generator must as a rule subsequently be adjusted to the desired clock pulse frequency in the testing of the infrared receiver circuit and thus before its delivery. Costs which cannot be neglected are associated with this.

The infrared receiver 11 in accordance with FIG. 12, in contrast, has a signal input 21 which is directly connected to the frequency setting terminal 19 of the bandpass filter 13. The clock pulse signal, which is very precise as a rule, of an external clock pulse generator 31, in the present case of a microcontroller, can be provided to the bandpass filter 13 via the signal input 21. The center frequency of the band of the bandpass filter 13 can therefore be set by the external clock pulse generator 31.

The external clock pulse signal is provided by a section 33 of the external clock pulse generator 31 which is connected to a signal output 35 of the external clock pulse generator 31. The section 33 of the external pulse generator 31 can be designed, for example, to derive the clock pulse signal from a frequency reference which anyway has a microcontroller, e.g. from the frequency of an internal or external quartz crystal. Alternatively, however, a line can also be toggled by software or the clock pulse signal can be generated by a counter integrated on the microcontroller. The signal output 35 of the external clock pulse generator 31 and the signal input 21 of the infrared receiver 11 are connected to one another via a line 51 for the transmission of the clock pulse signal generated by the clock pulse generator section 33 to the infrared receiver 11. Furthermore, the external clock pulse generator 31 has a signal input 37 to receive the demodulated wanted signal output at the signal output 17 of the infrared receiver 11, with the signal output 17 of the infrared receiver 11 and the signal input 37 of the external clock pulse generator 31 being connected to one another via a line 53.

In the infrared receiver 11 in accordance with FIG. 1, the signal input 21 is therefore formed separately from the signal output 17. The infrared receiver 111 in accordance with FIG. 2 differs in this from the infrared receiver 11 in accordance with FIG. 1.

In FIG. 2, the reference numerals are increased by 100 with respect to the corresponding elements in accordance with FIG. 1. In the infrared receiver 111 in accordance with FIG. 2, the signal input 121 is formed by the signal output 117. The signal output 117 is therefore also used for the reception of the external clock pulse signal in addition to the outputting of the demodulated wanted signal. Only one signal line 153 is present between the infrared receiver 111 and the external clock pulse generator 131.

Further modifications of the infrared receiver 111 in accordance with FIG. 2 are hereby required with the respect to the infrared receiver 11 in accordance with FIG. 1, as becomes clear from FIG. 3.

FIG. 3a shows the wanted signal 211 of the infrared receiver 111 before it is applied to the line 153 via the signal output 117 by means of an open collector output or an open drain output 123. FIG. 3b shows the clock pulse signal of the section 133 of the external clock pulse generator 131 before it is applied to the line 153 via the signal output 135 by means of an open collector output or an open drain output 139. Finally, the wanted signal 211 and the clock pulse signal are AND linked to one another so that the signal shown in FIG. 3c is applied as a whole to the line 153.

While the wanted signal 211 is output, the line 153 is therefore tied to ground (zero potential) so that the clock pulse signal of the external clock pulse generator 131 can no longer reach the infrared receiver 111. So that the clock pulse signal can nevertheless be provided to the frequency setting terminal 119 of the bandpass filter 113 during this time, the infrared receiver circuit includes a phase lock loop (PLL) 125 which is made to continue to output a frequency setting signal with the clock pulse frequency of the previously still received clock pulse signal to the bandpass filter 113. The PLL 125 can determine via a direct connection 127 between the demodulator 115 and the PLL when precisely the reception of the external clock pulse signal is interrupted.

Furthermore, the external clock pulse generator 131 is in a position to recognize the output of the wanted signal 211 despite its superimposition with the clock pulse signal. For this purpose, the external clock pulse generator 131 includes corresponding means 141. The means 141 can be of various natures.

The means 141 can be realized as software, for example. The external clock pulse generator 131 can in particular check the state of the line 153 every time the clock pulse signal of the clock pulse generator section 133 is at HIGH. If this state is then LOW, the status "infrared receiver active" is activated. This status is then maintained for so long until the state HIGH is again detected on such a check.

Alternatively, the clock pulse signal in accordance with FIG. 3b can be AND linked to a signal inverse to FIG. 3c, whereby the signal in accordance with FIG. 3d results. As soon as the signal in accordance with FIG. 3 adopts a high state, an interrupt input of the external clock pulse generator 131 is triggered to activate the status "infrared receiver active". At the same time, a counter begins to run which counts down after deactivation of the interrupt. When the counter reaches zero, i.e. when an interrupt no longer occurs in a preset time, the status "infrared receiver active" is deactivated again. If in this process one or more clock pulses are lost at the start or end of the wanted signal 211, this is generally not critical since a certain tolerance is permitted with respect to the wanted signal 211.

The signal in accordance with FIG. 3d can further alternatively be duplicated and the duplicated signal can be phase shifted by half a clock pulse of the clock pulse generator section 133 and the signal in accordance with FIG. 3d is AND linked to the phase shifted signal to gain a signal inverse to the wanted signal 211.

The clock pulse signal of the external clock pulse generator 31, 131 is continuously supplied to the infrared receivers 11, 111 in the embodiments shown in FIGS. 1 and 2.

In both cases, it is, however, also possible that the infrared receiver includes a PLL device or the like which synchronizes itself to the external clock pulse frequency during an initialization time period, for example on the switching on of the aforesaid TV set or DVD unit. The external clock pulse signal must in this case then be applied to the infrared receiver only for the duration of the initialization time section.

The infrared receiver in accordance with the invention makes it possible in a simple manner to avoid the cost-intensive tuning of an internal clock pulse generator or of the bandpass filter.

REFERENCE NUMERAL LIST

11 infrared receiver
13 bandpass filter
15 demodulator
17 signal output
19 frequency setting terminal
21 signal input
31 external clock pulse generator
33 section
35 signal output
37 signal input
51 line
53 line
111 infrared receiver
113 bandpass filter
115 demodulator
117 signal output
119 frequency setting terminal
121 signal input
123 open collector output or open drain output
125 phase locked loop
127 line
131 external clock pulse generator
133 section
135 signal output
137 signal input
139 open collector output or open drain output
141 means to recover the wanted signal
211 wanted signal

The invention claimed is:

1. An infrared receiver circuit for the reception of a carrier modulated infrared signal which includes a carrier signal and a wanted signal (211) modulated onto the carrier signal, with a bandpass filter (13, 113) with a frequency setting terminal (19, 119) via which the center frequency of the band of the bandpass filter (13, 113) can be set, furthermore with a demodulator (15, 115) for the recovery of the wanted signal (211) and with a signal output (17, 117) at which the demodulated wanted signal (211) can be output, the infrared receiver circuit (11, 111) comprising a signal input (21, 121) which is connected at least indirectly to the frequency setting terminal (19, 119) of the bandpass filter (13, 113) so that the center frequency of the band of the bandpass filter (13, 113) can be set by a clock pulse signal of an external clock pulse generator (31, 131), wherein an electrical oscillator (125) arranged between the signal input (121) and the bandpass filter (113) is provided, with the oscillator (125) being made to generate a frequency setting signal for the bandpass filter (113) in accordance with the clock pulse signal of the external clock pulse generator (31, 131), and wherein the oscillator (125) is made also still to generate the frequency setting signal in accordance with the external clock pulse signal when the external clock pulse signal is interrupted or is omitted.

2. An infrared receiver circuit in accordance with claim 1, wherein the signal input (121) is formed by the signal output (117).

3. An infrared receiver circuit in accordance with claim 1, wherein the signal input (21) is made separately from the signal output (17).

4. An infrared receiver circuit in accordance with claim 3, wherein the signal input (21) is directly connected to the bandpass filter (13).

5. An infrared receiver circuit in accordance with claim 1, wherein the oscillator (125) is made to recognize when the external clock pulse signal is interrupted.

6. An infrared receiver circuit in accordance with claim 1, wherein the demodulator (115) is connected to the oscillator (125), with the oscillator (125) being made to recognize with reference to the demodulated wanted signal (211) when the external clock pulse signal is interrupted.

7. An infrared receiver circuit in accordance with claim 1, wherein the oscillator (125) is made to synchronize the frequency setting signal for the bandpass filter (13, 113) to the external clock pulse signal during an initialization time period in which the external clock pulse signal is applied to the oscillator (125).

8. An infrared receiver circuit in accordance with claim 1, wherein the clock pulse frequency of the external clock pulse signal is different from a whole number multiple of the center frequency of the band of the bandpass filter (13, 113).

9. An infrared receiver circuit in accordance with claim 1, wherein the bandpass filter (13, 113) is made as a switched capacitor filter.

10. A device including an infrared receiver with an infrared receiver circuit (11, 111) in accordance with claim 1, and including an external clock pulse generator (13, 131) coupled to the infrared receiver circuit (11, 111).

11. A device in accordance with claim 10, wherein in the infrared receiver circuit (11, 111), the signal input (21, 121) is formed by the signal output (17, 117) and the external clock pulse generator (31, 131) includes means (141) which are made to extract the demodulated wanted signal (211) from the demodulated wanted signal (211) which is applied to the signal output (17, 117) of the infrared receiver circuit (11, 111) and on which the external clock pulse signal is superimposed.

12. An infrared receiver circuit for the reception of a carrier modulated infrared signal which includes a carrier signal and a wanted signal (211) modulated onto the carrier signal, with a bandpass filter (13, 113) with a frequency setting terminal (19, 119) via which the center frequency of the band of the bandpass filter (13, 113) can be set, furthermore with a demodulator (15, 115) for the recovery of the wanted signal (211) and with a signal output (17, 117) at which the demodulated wanted signal (211) can be output, the infrared receiver circuit (11, 111) comprising a signal input (21, 121) which is connected at least indirectly to the frequency setting terminal (19, 119) of the bandpass filter (13, 113) so that the center frequency of the band of the bandpass filter (13, 113) can be set by a clock pulse signal of an external clock pulse generator (31, 131), wherein an electrical oscillator (125) arranged between the signal input (121) and the bandpass filter (113) is provided, with the oscillator (125) being made to generate a frequency setting signal for the bandpass filter (113) in accordance with the clock pulse signal of the external clock pulse generator (31, 131), and wherein the oscillator (125) is made to synchronize the frequency setting signal for the bandpass filter (13, 113) to the external clock pulse signal during an initialization time period in which the external clock pulse signal is applied to the oscillator (125).

13. A device having an infrared receiver circuit for the reception of a carrier modulated infrared signal which includes a carrier signal and a wanted signal (211) modulated onto the carrier signal, with a bandpass filter (13, 113) with a frequency setting terminal (19, 119) via which the center frequency of the band of the bandpass filter (13, 113) can be set, furthermore with a demodulator (15, 115) for the recovery of the wanted signal (211) and with a signal output (17, 117) at which the demodulated wanted signal (211) can be output, the infrared receiver circuit (11, 111) comprising a signal input (21, 121) which is connected at least indirectly to the frequency setting terminal (19, 119) of the bandpass filter (13, 113) so that the center frequency of the band of the bandpass filter (13, 113) can be set by a clock pulse signal of an external clock pulse generator (31, 131), the external clock pulse generator (13, 131), coupled to the infrared receiver circuit (11, 111), wherein in the infrared receiver circuit (11, 111), the signal input (21, 121) is formed by the signal output (17, 117) and the external clock pulse generator (31, 131) includes means (141) which are made to extract the demodulated wanted signal (211) from the demodulated wanted signal (211) which is applied to the signal output (17, 117) of the infrared receiver circuit (11, 111) and on which the external clock pulse signal is superimposed.

* * * * *